(12) United States Patent
Liu et al.

(10) Patent No.: US 11,153,124 B2
(45) Date of Patent: Oct. 19, 2021

(54) CHANNEL ESTIMATION METHOD OF STEEL PENETRATION SYSTEM

(71) Applicant: University of Science and Technology Beijing, Beijing (CN)

(72) Inventors: Tao Liu, Beijing (CN); Hongwei Zhang, Beijing (CN); Jiajia Liu, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 0 days.

(21) Appl. No.: 17/265,843

(22) PCT Filed: Jul. 9, 2020

(86) PCT No.: PCT/CN2020/101052
§ 371 (c)(1),
(2) Date: Feb. 4, 2021

(87) PCT Pub. No.: WO2021/103555
PCT Pub. Date: Jun. 3, 2021

(65) Prior Publication Data
US 2021/0266196 A1    Aug. 26, 2021

(30) Foreign Application Priority Data
Nov. 29, 2019    (CN) .......................... 201911203417.7

(51) Int. Cl.
*H04L 25/02* (2006.01)
*H04L 5/00* (2006.01)
(Continued)

(52) U.S. Cl.
CPC ............ *H04L 25/022* (2013.01); *H04B 11/00* (2013.01); *H04B 17/391* (2015.01); *H04J 1/16* (2013.01);
(Continued)

(58) Field of Classification Search
CPC ................. H04L 25/022; H04L 5/0048; H04L 25/03159; H04B 17/391; H04B 11/00; H04J 1/16
See application file for complete search history.

(56) References Cited

U.S. PATENT DOCUMENTS

| | | | |
|---|---|---|---|
| 2013/0128932 A1 | 5/2013 | Huang et al. | |
| 2014/0161169 A1* | 6/2014 | Primerano | H04L 27/01 375/229 |
| 2015/0085949 A1* | 3/2015 | Saulnier | H04L 25/08 375/285 |

FOREIGN PATENT DOCUMENTS

| | | |
|---|---|---|
| CN | 102387115 A | 3/2012 |
| CN | 102497337 A | 6/2012 |
| | (Continued) | |

OTHER PUBLICATIONS

Kuoye Han, et al., Parameters Estimation using a Random Linear Array and Compressed Sensing, 3rd International Congress on Image and Signal Processing (CISP2010), 2010, pp. 3950-3954.

*Primary Examiner* — Duc C Ho
(74) *Attorney, Agent, or Firm* — Bayramoglu Law Offices LLC

(57) ABSTRACT

A channel estimation method of a steel penetration system is configured to reduce computational complexity and required memory. The method includes: reconstructing, at a receiving end, a channel estimation with a compressed-sensing sparse reconstruction algorithm according to a received pilot signal to obtain estimation values of a channel state response of the steel penetration system; and equalizing a received signal of the receiving end according to the estimation values of the channel state response to obtain an equalized signal.

4 Claims, 3 Drawing Sheets reconstructing, at the receiving end, channel estimation with a compressed-sensing sparse reconstruction algorithm according to a received pilot signal, so as to obtain estimation values of channel state response of a steel penetration system — 101 equalizing the received signal of the receiving end according to the obtained estimation values of channel state response to obtain an equalized signal — 102

(51) Int. Cl.
*H04B 17/391* (2015.01)
*H04L 25/03* (2006.01)
*H04J 1/16* (2006.01)
*H04B 11/00* (2006.01)

(52) U.S. Cl.
CPC ...... *H04L 5/0048* (2013.01); *H04L 25/03159* (2013.01)

(56) References Cited

FOREIGN PATENT DOCUMENTS

| | | | |
|---|---|---|---|
| CN | 103780521 | A | 5/2014 |
| CN | 106788824 | A | 5/2017 |
| CN | 107171988 | A | 9/2017 |
| CN | 108063657 | A | 5/2018 |
| CN | 108322409 | A | 7/2018 |
| CN | 108365898 | A | 8/2018 |
| CN | 111010355 | A | 4/2020 |

* cited by examiner

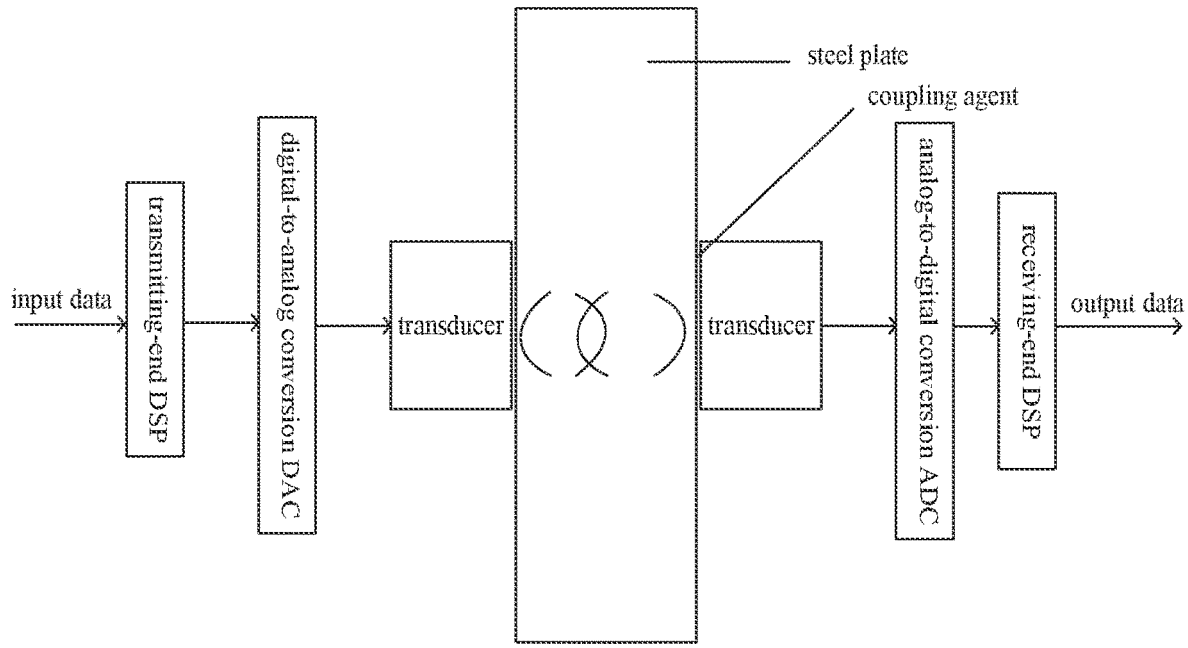

FIG. 1 (Prior Art)

| reconstructing, at the receiving end, channel estimation with a compressed-sensing sparse reconstruction algorithm according to a received pilot signal, so as to obtain estimation values of channel state response of a steel penetration system | 101 |

| equalizing the received signal of the receiving end according to the obtained estimation values of channel state response to obtain an equalized signal | 102 |

FIG. 2

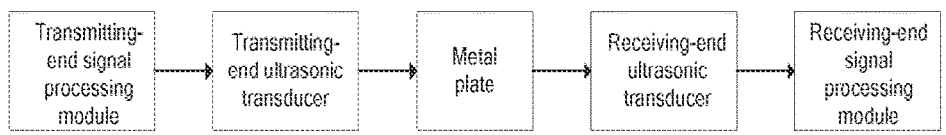

FIG. 3

CHANNEL ESTIMATION METHOD OF STEEL PENETRATION SYSTEM

CROSS REFERENCE TO RELATED APPLICATIONS

This application is the national stage entry of International Application No. PCT/CN2020/101052, filed on Jul. 9, 2020, which is based upon and claims priority to Chinese Patent Application No. 201911203417.7, filed on Nov. 29, 2019, the entire contents of which are incorporated herein by reference.

TECHNICAL FIELD

The present invention relates to the technical field of ultrasonic communication, and particularly to a channel estimation method of a steel penetration system.

BACKGROUND

In the fields of petroleum, gas, nuclear energy, or the like, a closed metal container is frequently used, and in industrial operation engineering, some information, such as temperature, humidity, or the like, in the closed metal container is often required to be collected. Radio frequency communication is unable to work normally due to the Faraday electromagnetic induction effect. Generally, these work environments require that the tightness of the metal container not be destroyed, and therefore, traditional drilling wire transmission technologies are unable to be used. An ultrasonic wave has good transmission characteristics and may penetrate through metal without damage to the tightness of the metal. Therefore, utilization of the ultrasonic wave as a signal carrier to transmit data in the metal has a broad application prospect. In order to meet signal transmission in these special environments, it is necessary to develop an ultrasonic steel penetration system.

As shown in FIG. 1, in the steel penetration system, a signal to be transmitted is processed by a transmitting-end DSP and passes through a DAC to obtain an analog signal; an electric signal of the analog signal is converted into an ultrasonic signal by a transmitting-end ultrasonic transducer; the ultrasonic signal is transmitted through a steel plate to a receiving-end ultrasonic transducer at the other side of the steel plate and converted by the receiving-end ultrasonic transducer into an electric signal which is converted into a digital signal by an ADC; and the digital signal is transmitted into a receiving-end DSP to obtain a received signal, thereby completing signal transmission of the steel penetration system.

Usually, during signal transmission, a modulation technology is adopted in the transmitting-end DSP for better adapting to baseband signal channel transportation, and demodulation technology is correspondingly adopted in the receiving-end DSP. A channel encoding operation during signal transmission may well improve the performance of the system and reduce the error rate thereof, and channel estimation is beneficial to a channel decoding operation.

However, in the steel penetration system, an existing channel estimation method includes performing channel estimation at a pilot point (i.e., a pilot position) based on least square estimation (LS)/minimum mean square error (MMSE) and then completing channel estimation of the whole system in conjunction with an interpolation algorithm, and these algorithms have complex computations and require large storage space.

SUMMARY

The present invention is intended to provide a channel estimation method of a steel penetration system, so as to solve the problems of high computational complexity and large storage space of an LS/MMSE-based channel estimation method in the prior art.

In order to solve the above-mentioned technical problem, an embodiment of the present invention provides a channel estimation method of a steel penetration system, including:

reconstructing, at the receiving end, channel estimation with a compressed-sensing sparse reconstruction algorithm according to a received pilot signal, so as to obtain estimation values of channel state response of the steel penetration system; and equalizing the received signal of the receiving end according to the obtained estimation values of channel state response to obtain an equalized signal.

Further, before reconstructing, at the receiving end, channel estimation with a compressed-sensing sparse reconstruction algorithm according to a received pilot signal, so as to obtain estimation values of channel state response of the steel penetration system, the method further includes:

determining, at the transmitting end, an insertion mode and an insertion interval of a pilot frequency;

determining an insertion position of the pilot frequency according to the determined insertion mode and insertion interval of the pilot frequency; and inserting the pilot frequency into an orthogonal frequency division multiplexing signal of a transmitted signal according to the determined insertion position of the pilot frequency, and transmitting the orthogonal frequency division multiplexing signal with the inserted pilot frequency.

Further, when the insertion mode and the insertion interval of the pilot frequency are determined, an obtained pilot-frequency selection matrix has a restricted isometry property after multiplied by a Fourier transformation matrix;

the pilot-frequency selection matrix, the transmitted signal, and the received signal have the following relationship:

$$PXFh = \Phi h = PY$$

wherein P represents the pilot-frequency selection matrix; Y represents the received signal; X represents the transmitted signal; PX represents the transmitted pilot signal; PY represents the received pilot signal; F represents the Fourier transformation matrix, which is a sparse matrix for varying a channel state response value h from a time domain to a frequency domain H; and $\Phi$ represents a sensing matrix.

Further, the reconstructing, at the receiving end, channel estimation with a compressed-sensing sparse reconstruction algorithm according to a received pilot signal, so as to obtain estimation values of channel state response of the steel penetration system includes:

A1, calculating inner products of the sensing matrix $\Phi$ and the received pilot signal PY, and selecting first L inner products in a descending order, wherein L has a value between 1 and the maximum sparsity K;

A2, representing the received pilot signal PY by y: $y = \Phi h$, forming a matrix $\Phi_t$ by columns of the sensing matrix corresponding to the selected L inner products, and obtaining an estimation value of h using the least square principle: $\hat{h}_t = (\Phi_t^T \Phi_t)^{-1} \Phi_t^T y$, wherein the superscript T represents matrix transposition, and the subscript t represents the current iteration number;

A3, determining a residual error $r_t$, wherein $r_t$ is represented as: $r_t = y - \Phi_t (\Phi_t^T \Phi_t)^{-1} \Phi_t^T y$; and A4, judging whether the current iteration number t is less than the maximum sparsity K, if yes, returning to step A1 to continue execution, and changing step A1 into a step of calculating inner products of the sensing matrix and the residual error $r_t$; otherwise, reconstructing the obtained h, i.e., $\hat{h}_t$ obtained by current iteration, and obtaining the estimation values of channel state response H utilizing $H=F\hat{h}$.

Further, equalizing the received signal of the receiving end according to the obtained estimation values of channel state response to obtain an equalized signal includes:

equalizing the received signal of the receiving end according to the formula Y'=Y×H to obtain the equalized signal Y', wherein Y represents the received signal and H represents the estimation values of channel state response;

wherein the channel state response value H(n+1) at the (n+1)th iteration is represented as:

$$H(n+1)=H(n)+\mu \times e \times Y'$$

wherein H(n) represents the channel state response value at the nth iteration; µ represents a learning rate; e represents a deviation, e=Y−Y'.

Further, the steel penetration system includes: a transmitting-end signal processing module, a transmitting-end ultrasonic transducer connected with the transmitting-end signal processing module, a metal plate connected with the transmitting-end ultrasonic transducer, a receiving-end ultrasonic transducer connected with the metal plate, and a receiving-end signal processing module connected with the receiving-end ultrasonic transducer;

wherein the ultrasonic transducers are stuck to the metal plate with a coupling agent;

the transmitting-end ultrasonic transducer and the receiving-end ultrasonic transducer are mounted coaxially and symmetrically at the two sides of the metal plate.

Further, the method includes:

performing a frequency sweeping test on a channel propagation model of the steel penetration system, and determining the sizes of the ultrasonic transducers, the coupling agent and the metal plate according to a test result.

Further, the method includes:

building the channel propagation model of the steel penetration system based on the material characteristics of the ultrasonic transducers, the coupling agent, and the metal plate.

The above-mentioned technical solution of the present invention has the following beneficial effects.

In the above-mentioned solution, channel estimation is realized with the compressed-sensing sparse reconstruction algorithm according to the sparse characteristic of a sparse channel formed by the multipath effect of the steel penetration system, and utilization of the compressed-sensing sparse reconstruction algorithm may realize the channel estimation of the steel penetration system under the condition of reducing memory and sampling rate, thereby reducing the error rate and the computational complexity, and improving the accuracy of transmitted data.

BRIEF DESCRIPTION OF THE DRAWINGS

FIG. 1 is a schematic structural diagram of an existing steel penetration system;

FIG. 2 is a schematic flow chart of a channel estimation method of a steel penetration system according to an embodiment of the present invention;

FIG. 3 is a schematic structural diagram of the steel penetration system according to an embodiment of the present invention;

DETAILED DESCRIPTION OF THE EMBODIMENTS

Figure 4:
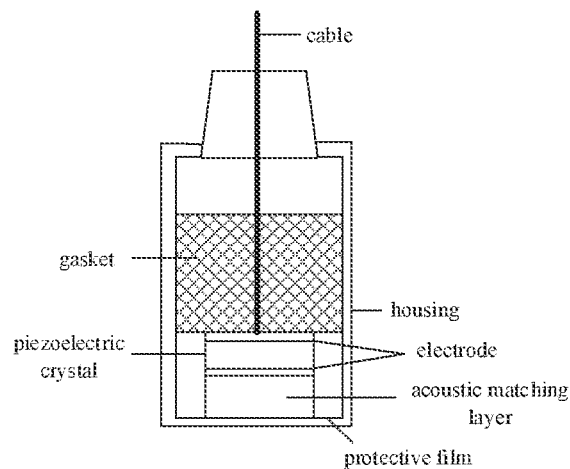
FIG. 4 is a schematic structural diagram of an ultrasonic transducer according to an embodiment of the present invention.

To make the technical problems to be solved, technical solutions, and advantages of the present invention more apparent, the following detailed description is given with reference to the accompanying drawings and embodiments.

In order to solve the problems of high computational complexity and large storage space of an existing LS/MMSE-based channel estimation method, the present invention provides a channel estimation method of a steel penetration system.

As shown in FIG. 2, the channel estimation method of a steel penetration system according to the embodiment of the present invention includes:

S101, reconstructing, at the receiving end, channel estimation with a compressed-sensing sparse reconstruction algorithm according to a received pilot signal, so as to obtain estimation values of channel state response of the steel penetration system; and S102, equalizing the received signal of the receiving end according to the obtained estimation values of channel state response to obtain an equalized signal.

In the channel estimation method of a steel penetration system according to the embodiment of the present invention, channel estimation is realized with the compressed-sensing sparse reconstruction algorithm according to the sparse characteristic of a sparse channel formed by the multipath effect of the steel penetration system, and utilization of the compressed-sensing sparse reconstruction algorithm may realize the channel estimation of the steel penetration system under the condition of reducing memory and sampling rate, thereby reducing an error rate and the computational complexity, and improving the accuracy of transmitted data.

It should be noted that:

the compressed sensing technology breaks through the limitation that the Nyquist sampling theorem requires that a signal can be reconstructed accurately only when the sampling rate reaches more than twice the bandwidth, and in the compressed sensing technology, reconstruction may be performed by sampling a small number of useful points in the signal, such that the compressed sensing technology improves the requirement for the high sampling rate and the defect that the storage space is wasted by invalid redundant information.

In order to better understand the channel estimation method of the steel penetration system according to the present invention, the steel penetration system is first explained briefly.

In an implementation of the foregoing channel estimation method of a steel penetration system, further, as shown in FIG. 3, the steel penetration system includes: a transmitting-end signal processing module, a transmitting-end ultrasonic transducer connected with the transmitting-end signal processing module, a metal plate (for example, steel plate) connected with the transmitting-end ultrasonic transducer, a receiving-end ultrasonic transducer connected with the metal plate, and a receiving-end signal processing module connected with the receiving-end ultrasonic transducer;

wherein the signal processing modules are connected with the ultrasonic transducers through wires, the ultrasonic transducers are stuck to the metal plate with a coupling agent, and an ultrasonic wave is transmitted in the metal plate;

the transmitting-end ultrasonic transducer and the receiving-end ultrasonic transducer are mounted coaxially and symmetrically at the two sides of the metal plate.

FIG. 4 is a schematic structural diagram of a typical ultrasonic transducer, and the ultrasonic transducer is not limited to this structure in the present invention, and a piezoelectric crystal in the ultrasonic transducer is configured as a core component for transmitting and receiving the ultrasonic wave.

In an implementation of the foregoing channel estimation method of a steel penetration system, further, the method includes:

building a channel propagation model of the steel penetration system based on the material characteristics of the ultrasonic transducers, the coupling agent, and the metal plate.

In this embodiment, the channel propagation model represents the transmission characteristic of the ultrasonic wave in the steel penetration system, and specifically, according to the Huygens principle, propagation of the ultrasonic wave in the channel has phenomena of reflection, refraction, diffraction, or the like; the steel penetration system may be determined to be a frequency selective fading channel according to these phenomena, and in order to eliminate the multipath effect generated by these phenomena, materials of the metal plate, the ultrasonic transducers and the coupling agent are required to be selected reasonably, and the sizes of the materials in the steel penetration system, including the radius and the thickness of the ultrasonic transducers, the thickness of the steel plate and the thickness of the coupling agent, are required to be designed reasonably.

As a preferred embodiment, the method further includes:

performing a frequency sweeping test on the channel propagation model of the steel penetration system, and determining the sizes of the ultrasonic transducers, the coupling agent and the metal plate according to a test result.

Figure 5:
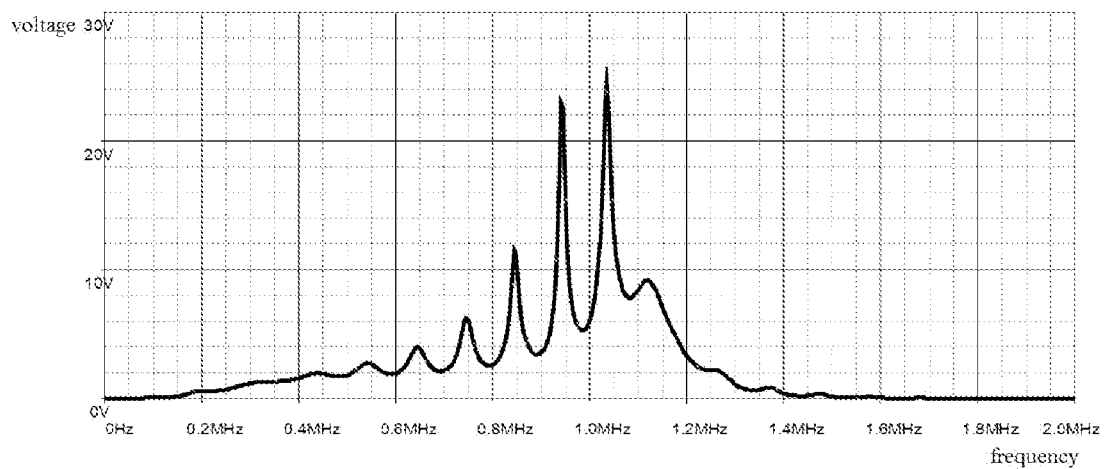
FIG. 5 is a schematic diagram of a frequency sweeping response result according to an embodiment of the present invention.

In this embodiment, the frequency sweeping test may be performed on the channel propagation model of the steel penetration system using circuit simulation software Pspice, and specifically, according to a formula of the resonant frequency and the thicknesses of the steel plate and the ultrasonic transducers, the required sizes of the steel plate and the ultrasonic transducers for obtaining a combined resonance may be obtained; for example, as shown in FIG. 5, the vertical axis represents voltage; the horizontal axis represents frequency; according to the frequency sweeping result, the steel plate may be selected to have a thickness of 28 mm; the ultrasonic transducers may be selected to have a thickness of 2.25 mm and a radius of 30 mm, and the resonance is generated every 0.104 MHz.

It should be noted that the sizes of the ultrasonic transducers, the coupling agent, and the metal plate may be determined according to an actual application scenario, and are not limited in this embodiment.

In the present application, the channel propagation model may be represented as $Y=XH+N$, wherein Y represents a received signal; X represents a transmitted signal; H represents a channel state response; and N represents white Gaussian noise.

Figure 6:
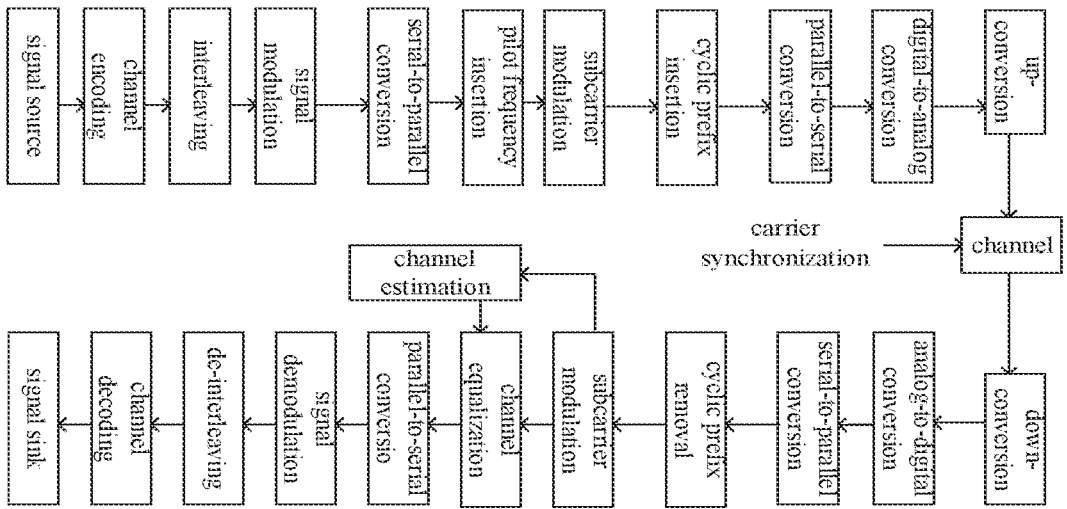
FIG. 6 is a schematic diagram of a work flow of the steel penetration system according to an embodiment of the present invention.

In this embodiment, FIG. 6 is a schematic diagram of a work flow of the steel penetration system; at the transmitting end, after operations of channel encoding, interleaving, signal modulation, serial-to-parallel conversion, pilot frequency insertion, subcarrier modulation, cyclic prefix insertion, parallel-to-serial conversion, digital-to-analog conversion, and up-conversion are performed on the transmitted signal (signal source) in sequence, the transmitted signal is transmitted through the channel; at the receiving end, operations of down-conversion, analog-to-digital conversion, serial-to-parallel conversion, cyclic prefix removal, subcarrier modulation, channel estimation, channel equalization, parallel-to-serial conversion, signal demodulation, de-interleaving, and channel decoding are sequentially performed on the received signal to obtain the equalized signal (signal sink).

In this embodiment, the operations of channel encoding, interleaving, signal modulation, serial-to-parallel conversion, pilot frequency insertion, subcarrier modulation, cyclic prefix insertion, parallel-to-serial conversion, digital-to-analog conversion, and up-conversion are completed in the transmitting-end signal processing module; the operations of down-conversion, analog-to-digital conversion, serial-to-parallel conversion, cyclic prefix removal, subcarrier modulation, channel estimation, channel equalization, parallel-to-serial conversion, signal demodulation, de-interleaving, and channel decoding are completed in the receiving-end signal processing module.

In this embodiment, the channel encoding operation achieves the purpose of performing error correction and a check on a band-transferred original signal by adding redundant bit information, and a random error may be corrected by a channel error correction code; the interleaving operation is used for converting a burst error into the random error for decoding and error correction; the signal modulation operation is used for increasing bits when each orthogonal frequency division multiplexing (OFDM) signal symbol is transmitted, and generally includes BPSK, QPSK, 8PSK, 16QAM, or the like; the serial-to-parallel conversion operation means that a serial data stream is converted into a parallel data stream for later OFDM modulation; the pilot frequency insertion operation is used for channel estimation; the subcarrier modulation operation means OFDM modulation; the cyclic prefix insertion operation is used for eliminating inter-symbol interference.

In an implementation of the foregoing channel estimation method of a steel penetration system, further, before reconstructing, at the receiving end, channel estimation with a compressed-sensing sparse reconstruction algorithm according to a received pilot signal, so as to obtain estimation values of channel state response of the steel penetration system, the method further includes:

determining, at the transmitting end, an insertion mode and an insertion interval of a pilot frequency;

determining an insertion position of the pilot frequency according to the determined insertion mode and insertion interval of the pilot frequency; and inserting the pilot frequency into an orthogonal frequency division multiplexing signal of the transmitted signal according to the determined insertion position of the pilot frequency, and transmitting the orthogonal frequency division multiplexing signal with the inserted pilot frequency.

In this embodiment, the insertion mode of the pilot frequency is determined at the transmitting end and may include random pilot-frequency insertion, uniform pilot-frequency insertion, or the like.

In this embodiment, the insertion interval of the pilot frequency may be determined according to the number of subcarriers of the orthogonal frequency division multiplexing (OFDM) signal of the transmitted signal.

In an implementation of the foregoing channel estimation method of a steel penetration system, further, when the insertion mode and the insertion interval of the pilot frequency are determined, an obtained pilot-frequency selection matrix has a restricted isometry property (RIP) after multiplied by a Fourier transformation matrix.

In this embodiment, the pilot-frequency selection matrix is used to select data at a corresponding position of the pilot frequency in the transmitted signal, and the pilot-frequency selection matrix, the transmitted signal, and the received signal have the following relationship:

$$PXFh = \Phi h = PY$$

wherein P represents the pilot-frequency selection matrix; Y represents the received signal; X represents the transmitted signal; PX represents the transmitted pilot signal; PY represents the received pilot signal; F represents the Fourier transformation matrix for varying a channel state response value h from a time domain to a frequency domain H; and $\Phi$ represents a sensing matrix.

In this embodiment, the Fourier transformation matrix is a sparse matrix, the pilot signal is a measurement matrix, and the sensing matrix is a product of the measurement matrix and the sparse matrix.

In an implementation of the foregoing channel estimation method of a steel penetration system, further, the reconstructing, at the receiving end, channel estimation with a compressed-sensing sparse reconstruction algorithm according to a received pilot signal, so as to obtain estimation values of channel state response of the steel penetration system includes:

A1, calculating inner products of the sensing matrix $\Phi$ and the received pilot signal PY, and selecting first L inner products in a descending order, wherein L has a value between 1 and the maximum sparsity K, and K may have an approximate value determined according to the number of channels of a common steel penetration system and is generally 5-16, or the like;

A2, representing the received pilot signal PY by y: $y = \Phi h$, forming a matrix $\Phi_t$ by columns of the sensing matrix corresponding to the selected L inner products, and obtaining an estimation value of h using the least square principle: $\hat{h}_t = (\Phi_t^T \Phi_t)^{-1} \Phi_t^T y$, wherein the superscript T represents matrix transposition, and the subscript t represents the current iteration number;

A3, determining a residual error $r_t$, wherein $r_t$ is represented as: $r_t = y - \Phi_t(\Phi_t^T \Phi_t)^{-1} \Phi_t^T y$; and A4, judging whether the current iteration number t is less than the maximum sparsity K, if yes, returning to step A1 to continue execution, and changing step A1 into a step of calculating inner products of the sensing matrix $\Phi$ and the residual error $r_t$; otherwise, reconstructing the obtained h, i.e., $\hat{h}_t$ obtained by current iteration, and obtaining the estimation values of channel state response H utilizing $H = F\hat{h}$.

Figure 7:
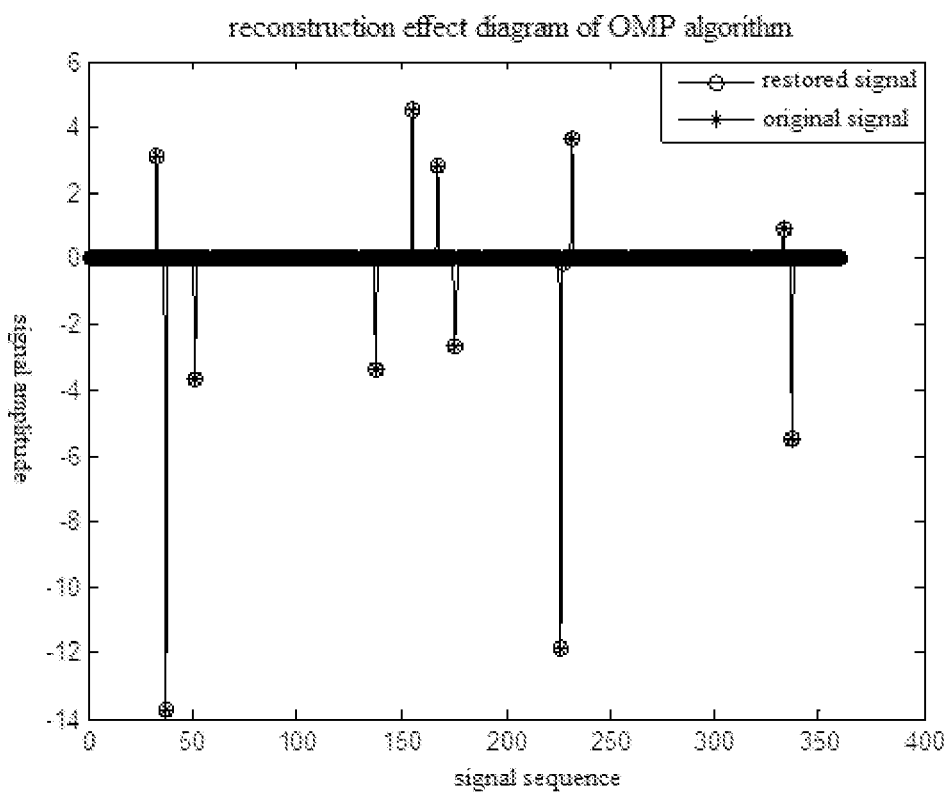
FIG. 7 is a schematic diagram of a reconstruction effect of a compressed-sensing sparse reconstruction algorithm according to an embodiment of the present invention.

In this embodiment, the receiving-end signal processing module may perform reconstruction with an orthogonal matching pursuit (OMP) algorithm, and a reconstruction effect diagram is shown in FIG. 7; the sparse reconstruction algorithm OMP may also be replaced by other algorithms, for example, a regularized orthogonal matching pursuit (ROMP) algorithm and a convex relaxation algorithm, and the sparse reconstruction algorithm may be specifically determined according to the actual application scenario.

Compared with the LS/MMSE-based channel estimation method, the channel estimation method of a steel penetration system according to this embodiment has a better channel estimation effect at a low signal-to-noise ratio.

In an implementation of the foregoing channel estimation method of a steel penetration system, further, equalizing the received signal of the receiving end according to the obtained estimation values of channel state response to obtain an equalized signal includes:

equalizing the received signal of the receiving end according to the formula $Y' = Y \times H$ to obtain the equalized signal Y', wherein Y represents the received signal, and H represents the estimation values of channel state response;

wherein the channel state response value H(n+1) at the (n+1)th iteration is represented as:

$$H(n+1) = H(n) + \mu \times e \times Y'$$

wherein H(n) represents the channel state response value at then th iteration; $\mu$ represents a learning rate; e represents a deviation, $e = Y - Y'$.

In this embodiment, the iteration stop condition of the formula $Y' = Y \times H$ is the iteration number when H tends to be stable.

It should be noted that, in this document, relational terms, such as first, second, or the like, are used solely to distinguish one entity or operation from another entity or operation without necessarily requiring or implying any actual such relationship or order between such entities or operations.

It should be noted that the above descriptions are merely preferred embodiments of the present invention, and those skilled in the art may make various improvements and refinements without departing from the principle of the invention. All such modifications and refinements are intended to be covered by the present invention.

What is claimed is:

1. A channel estimation method of a steel penetration system, comprising:
reconstructing, at a receiving end, a channel estimation with a compressed-sensing sparse reconstruction algorithm according to a received pilot signal to obtain estimation values of a channel state response of the steel penetration system; and
equalizing a received signal of the receiving end according to the estimation values of the channel state response to obtain an equalized signal;
wherein before the step of reconstructing, at the receiving end, the channel estimation with the compressed-sensing sparse reconstruction algorithm according to the received pilot signal to obtain the estimation values of the channel state response of the steel penetration system, the channel estimation method further comprises:
determining, at a transmitting end, an insertion mode and an insertion interval of a pilot frequency;
determining an insertion position of the pilot frequency according to the insertion mode and the insertion interval of the pilot frequency; and
inserting the pilot frequency into an orthogonal frequency division multiplexing signal of a transmitted signal according to the insertion position of the pilot frequency, and transmitting the orthogonal frequency division multiplexing signal with the pilot frequency;

wherein when the insertion mode and the insertion interval of the pilot frequency are determined to obtain a pilot-frequency selection matrix, the pilot-frequency selection matrix has a restricted isometry property after multiplied by a Fourier transformation matrix;

the pilot-frequency selection matrix, the transmitted signal, and the received signal have the following relationship:

$$PXFh=\Phi h=PY;$$

wherein P represents the pilot-frequency selection matrix;
Y represents the received signal;
X represents the transmitted signal;
PX represents a transmitted pilot signal;
PY represents the received pilot signal;
F represents the Fourier transformation matrix, wherein the Fourier transformation matrix is a sparse matrix for varying a channel state response value h from a time domain to a frequency domain H; and
$\Phi$ represents a sensing matrix;

wherein the step of reconstructing, at the receiving end, the channel estimation with the compressed-sensing sparse reconstruction algorithm according to the received pilot signal to obtain the estimation values of the channel state response of the steel penetration system comprises:

A1, calculating inner products of the sensing matrix $\Phi$ and the received pilot signal PY, and selecting first L inner products in a descending order, wherein L has a value between 1 and a maximum sparsity K;

A2, representing the received pilot signal PY by y: $y=\Phi h$, forming a matrix $\Phi_t$ by columns of the sensing matrix corresponding to the L inner products, and obtaining an estimation value of the channel state response value h using a least square principle: $\hat{h}_t=(\Phi_t^T\Phi_t)^{-1}\Phi_t^T y$, wherein a superscript T represents a matrix transposition, and a subscript t represents a current iteration number;

A3, determining a residual error $r_t$, wherein $r_t$ is represented as: $r_t=y-\Phi_t(\Phi_t^T\Phi_t)^{-1}\Phi_t^T y$; and A4, judging whether the current iteration number t is less than the maximum sparsity K, if the current iteration number t is less than the maximum sparsity K, returning to step A1 to continue execution, and changing step A1 into a step of calculating the inner products of the sensing matrix $\Phi$ and the residual error $r_t$ if the current iteration number t is more than or equal to the maximum sparsity K, reconstructing an obtained h, wherein the obtained h is $\hat{h}_t$ obtained by current iteration, and obtaining the estimation values of the channel state response H utilizing $H=F\hat{h}$;

wherein the step of equalizing the received signal of the receiving end according to the estimation values of the channel state response to obtain the equalized signal comprises:

equalizing the received signal of the receiving end according to the formula $Y'=Y\times H$ to obtain the equalized signal Y', wherein Y represents the received signal, and H represents the estimation values of the channel state response;

wherein the channel state response value H(n+1) at an (n+1)th iteration is represented as:

$$H(n+1)=H(n)+\mu\times e\times Y',$$

wherein H(n) represents the channel state response value at an nth iteration; $\mu$ represents a learning rate; e represents a deviation, $e=Y-Y'$.

2. The channel estimation method according to claim 1, wherein the steel penetration system comprises:

a transmitting-end signal processing module, wherein a transmitting-end ultrasonic transducer connected with the transmitting-end signal processing module, a metal plate connected with the transmitting-end ultrasonic transducer, a receiving-end ultrasonic transducer connected with the metal plate, and a receiving-end signal processing module connected with the receiving-end ultrasonic transducer;

the ultrasonic transducers are stuck to the metal plate with a coupling agent;

the transmitting-end ultrasonic transducer and the receiving-end ultrasonic transducer are mounted coaxially and symmetrically at two sides of the metal plate.

3. The channel estimation method according to claim 2, further comprising:

performing a frequency sweeping test on a channel propagation model of the steel penetration system, and determining sizes of the transmitting-end ultrasonic transducer, the receiving-end ultrasonic transducer, the coupling agent and the metal plate according to a test result.

4. The channel estimation method according to claim 3, further comprising:

building the channel propagation model of the steel penetration system based on material characteristics of the transmitting-end ultrasonic transducer, the receiving-end ultrasonic transducer, the coupling agent, and the metal plate.

\* \* \* \* \*